United States Patent [19]
Bishop

[11] Patent Number: 4,888,662
[45] Date of Patent: Dec. 19, 1989

[54] HIGH PRESSURE PACKAGE FOR PRESSURE TRANSDUCERS

[75] Inventor: Robert P. Bishop, Carver, Mass.

[73] Assignee: Texas Instruments Incorporated, Dallas, Tex.

[21] Appl. No.: 282,185

[22] Filed: Dec. 8, 1988

[51] Int. Cl.$^4$ .......................... H01G 7/00; G01L 9/12
[52] U.S. Cl. ........................................ 361/283; 73/724
[58] Field of Search ......................... 73/718, 724, 726; 361/283

[56] References Cited

U.S. PATENT DOCUMENTS

| | | | |
|---|---|---|---|
| 4,128,006 | 12/1978 | Grabow | 73/724 |
| 4,329,732 | 5/1982 | Kavli et al. | 361/283 |
| 4,414,851 | 11/1983 | Maglic | 73/724 X |
| 4,716,492 | 12/1987 | Charboneau et al. | 361/283 |

Primary Examiner—Donald A. Griffin
Attorney, Agent, or Firm—James P. McAndrews; John A. Haug; Melvin Sharp

[57] ABSTRACT

The disclosure relates to a pressure transducer for use in measurement of pressures in the range of 3000 to 5000 psi and above wherein the pressure sensing module is physically separated from the electrical connector by a barrier formed from a material which is less readily deformable under high pressure than the connector. This is accomplished in one embodiment by separating the electrical connector from the pressure sensing element by a metal support ring against which the pressure sensing element bears. In accordance with a second embodiment, the electrical connector is disposed externally of the housing with the pressure sensing element being disposed within the housing and bearing against an interior wall thereof. In accordance with a third embodiment, the housing is formed of two inexpensive members, one crimped within the other, with the pressure sensing module bearing against an interior wall of the inner housing member and the connector being crimped to the system by a flange on the outer housing member. Preferably, a conductor, which is connected to the circuit ground of the electronic circuitry is also coupled to the system ground by crimping it between the housing and the electrical connector during the crimping of the connector to the remainder of the transducer.

25 Claims, 2 Drawing Sheets

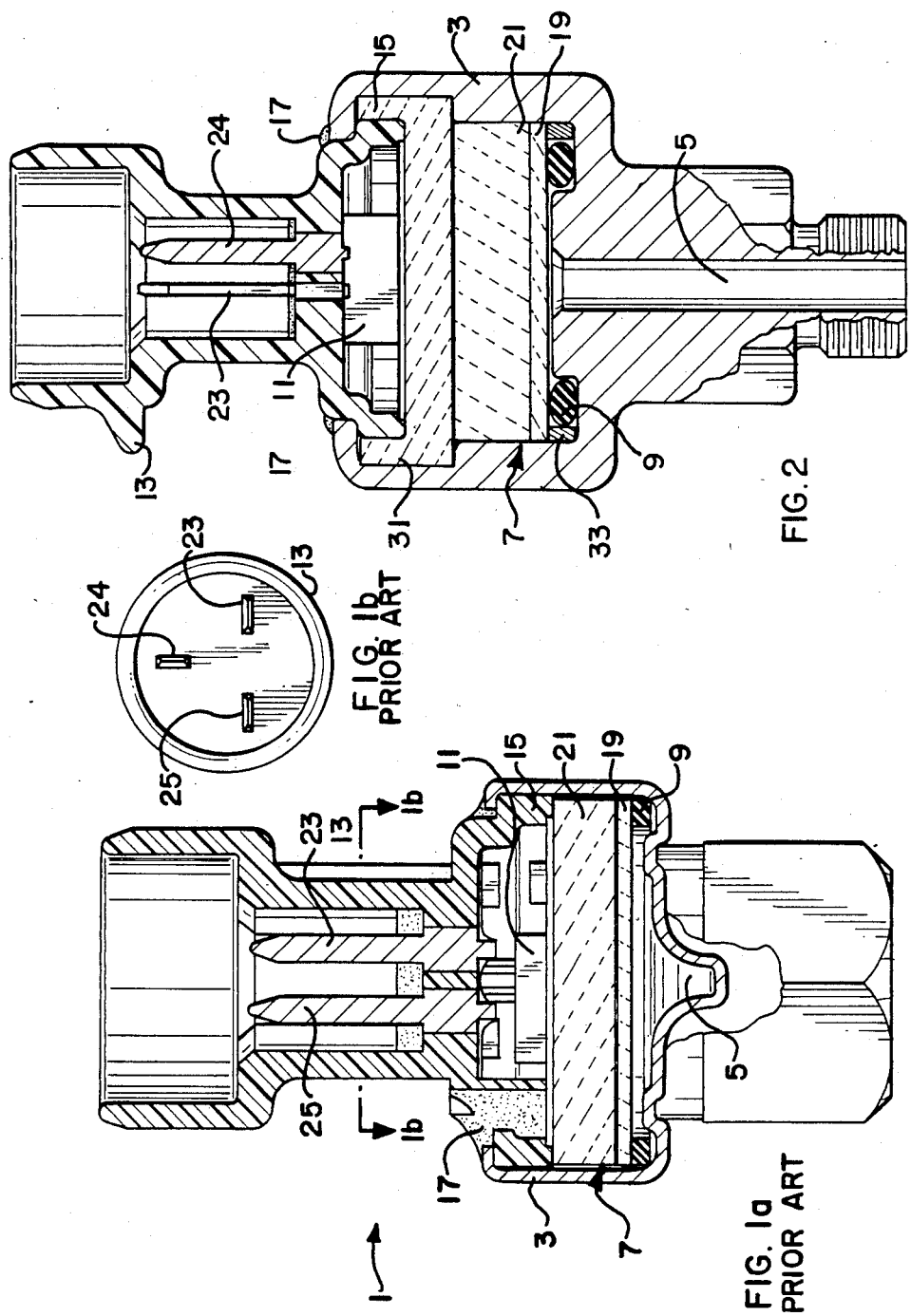

HIGH PRESSURE PACKAGE FOR PRESSURE TRANSDUCERS

CROSS REFERENCE TO RELATED APPLICATION

This application is related to application Ser. No. 278,877, filed Dec. 2, 1988 for Pressure Sensor of Robert P. Bishop et al., the contents of which are incorporated herein by reference.

BACKGROUND OF THE INVENTION

1. Field of the Invention

This invention relates to a packaging technique for pressure transducers and, more specifically, to such packaging for pressure transducers capable of measuring high pressures in the range of up to about 5000 psi.

2. Brief Description of the Prior Art

Pressure sensors containing pressure transducers are well known, typical such systems being described in Pat. Nos. 4,716,492 and 4,774,626.

Pressure transducers of the prior art have generally been fabricated by providing a pressure sensing module in the form of a variable capacitor responsive to pressure which abutted an electronic circuit. The electronic circuit sensed the capacitance of the capacitor and provided an output through a plastic electrical connector indicative of the sensed pressure. The transducer elements were arranged such that a metal cup assembly having an opening or pressure inlet at one end thereof to receive the fluid under pressure to be measured also included therein the pressure sensing module which was separated from the inlet by a gasket, the electronic circuit and connector also being contained within the metal cup. The parts were held together within the metal cup by crimping the metal cup over the plastic connector, the latter being used as a support member.

The above described pressure transducer provided highly satisfactory results when operated in the low to moderate pressure ranges of up to 500 to 600 psi. However, when subjected to pressures at the pressure inlet in the range of about 3000 to 5000 psi and up, the above described pressure transducers tended to fail. There were several points of failure, these being from the inability of the plastic connector to support the high pressures to which it was being subjected. More specifically, the crimp at the metal cup was unable to retain the electrical connector crimped thereunder with the result that the connector was moved out of the cup and caused a failure of the transducer. A further point of failure was the plastic connector itself which would tend to shear or compress and release the gasket under the high pressure and release the gas under pressure. It is therefore clear that the prior art pressure transducer of the type described hereinabove was incapable of reliable operation in the high pressure environment.

SUMMARY OF THE INVENTION

In accordance with the present invention, the above noted problem of the prior art is minimized and possibly overcome and there is provided a pressure transducer which is capable of withstanding operation, proof and burst pressures in the high pressure ranges of up to about 5000 psi and possibly greater.

Briefly, in accordance with the present invention, the pressure sensing element is isolated from the connector by being disposed in an all metal surrounded cavity whereby the plastic connector is separated from the pressure sensing element and is not bearing the loads produced by the high pressure fluid. This is accomplished by means of a metal member disposed between the pressure sensing element and the plastic connector whereby the high pressures encountered by the pressure transducer are never applied to the plastic connector.

In accordance with a first embodiment of the invention, a support ring is disposed within the metal cup or can and between the pressure sensing element and the plastic connector with the electronic circuit being disposed in the open portion of the ring between the connector and the pressure sensing element. In this arrangement, the metal cup or can is crimped over both the metal support ring and the plastic connector disposed therein to hold them in place, fixturing the pressure sensing module securely within the can. The gasket and pressure sensing module are as in the above noted prior art with the pressure sensing element abutting the metal support ring which provides the required support. The support ring may be open at its center region as above discussed or solid with holes or slots for the electrical feed from the pressure sensing element to the electronic circuitry. The can is in one piece with a threaded fitting to mate to the pressure port on the system with which the transducer is used. A hex configuration is formed on the part to allow the use of a wrench on the body of the device. The use of one piece as opposed to a separate can and port fitting has several advantages. For example, there are fewer parts and assembly operations and a potential leak path that would result from the joining of two parts is eliminated. The use of this assembly configuration fixtures the pressure sensing element independently of the connector, yet allows for component loading from one end during assembly, this being advantageous from both cost and complexity standpoints.

In accordance with a second embodiment of the invention, the independent fixturing of the pressure sensing element is maintained. Here a can is used to enclose the pressure sensing element. The can is crimped over a hexport which allows mounting to the system being sensed. The other end of the can has a raised wall which crimps over the plastic connector, holding the connector in place and enclosing the electronic circuitry. Holes or slots are used in the can as required for electrical feed-throughs and gaskets and/or seals are used, where necessary, to protect the internal components.

In accordance with a third embodiment, two inexpensive metal cans are used in place of the single can used in the second embodiment. The first can is used to fixture the pressure sensing element and crimp over a hexport. The second can is used to crimp over the first can at one end and over the plastic connector at the other end to enclose the electronic circuitry and hold the assembly together.

Preferably, the embodiments use a flexible circuit as the mounting surface for the electronic circuitry. This allows for fold-up assembly during manufacture of the device. In addition, the flexible circuit allows for direct connections to the pins on the ceramic sensing element and the connector without the addition of wires and the connections required to attach them. The flexible circuit also allows for a direct connection from the circuit module to the can. This is done to couple the transducer ground pin to the metal can (system ground) to improve the device's electromagnetic compatibility (EMC) This is accomplished by folding a conductive "tail" from the flexible circuit over the edge of the connector and crimping the can thereover to make electrical contact.

BRIEF DESCRIPTION OF THE DRAWINGS

FIG. 1a is a cross sectional view of a prior art pressure transducer;

FIG. 1b is a view taken along the line 1b—1b of FIG. 1a;

FIG. 2 is a cross sectional view of a pressure transducer in accordance with a first embodiment of the present invention;

DESCRIPTION OF THE PREFERRED EMBODIMENTS

Figure 3:
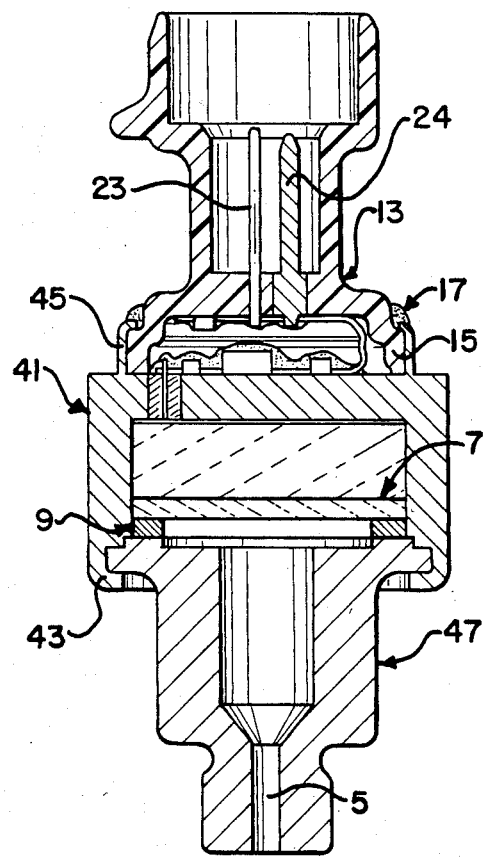
FIG. 3 is a cross sectional view of a pressure transducer in accordance with a second embodiment of the present invention.

Referring first to FIGS. 1a and 1b, there is shown a pressure transducer 1 in accordance with the prior art. The transducer includes an outer metal can or cap 3 having a pressure inlet 5 at one surface thereof and a pressure sensing module 7 within the can separated from the inlet by a gasket or O-ring 9. Electronic circuitry 11 is positioned in contact with the module 7 and is otherwise surrounded by a plastic electrical connector 13 having a flange portion 15 over which the can 3 is crimped. An environmental sealant 17 is positioned at the junction of the can 3 and the connector 13 to prevent contaminants from travelling between the can and connector to the electronic circuitry 11. Three terminals 23, 24 and 25 extend outwardly at the rear of the connector and are connected to the electronic circuitry to provide an output therefrom. The pressure sensing module 7 is composed of a pair of ceramic layers 19 and 21 which are spaced from each other, each layer having an electrically conductive coating thereon on opposing surfaces to form a capacitor. The layer 19 receives the force of fluid entering the pressure inlet 5 thereon and, operating as a diaphragm, varies the distance between electrically conductive coatings to vary the capacitance of the capacitor as a function of applied pressure. As stated above, the above described pressure transducer provides excellent results with pressures at the pressure inlet of up to about 600 psi. However, at high pressures, such as in the range of 3000 psi and higher, failures occur due to movement of the crimp over the connector and release of the connector. Also, failures occur due to compression of the connector and movement of the gasket between the can and the connector to permit inlet fluid to escape through the rear of the transducer due to leakage.

Referring now to FIG. 2, wherein all structure similar to that of FIG. 1 bears the same reference character, there is shown a first embodiment in accordance with the present invention. This embodiment is similar to that described with respect to FIGS. 1a and 1b except that a metal support ring 31 capable of withstanding pressures in the range of up to about 5000 psi is disposed between the pressure sensing module 7 and the electrical connector 13 to isolate the electrical connector and the electronic circuitry 11 from the high pressure applied at the pressure inlet 5. In this embodiment, the can 3 is shown to be crimped over both the support ring 31 as well as the flange 15 of the connector 13. Also, an O-ring 9 is used in conjunction with a rigid back-up ring 33, preferably of polytetrafluoroethylene (Teflon) to prevent the O-ring from movement between the sensing element 7 and the can 3. It should be noted that seating systems other than an O-ring, such as, for example, gaskets, lip seals, metal seals and the like, can be used. The result is that metal has been crimped over metal to provide an ability to withstand the high pressures to be encountered with transducer failure. The exterior surface of the pressure inlet 5 can be threaded to receive a mating threaded member (not shown).

Referring now to FIG. 3, wherein all structure similar to that of FIGS. 1a, 1b and 2 bears the same reference character, there is shown a second embodiment in accordance with the present invention. In accordance with this embodiment the metal can 41 comprises a set of crimping flanges 43 and 45 at opposite ends thereof, the crimping flanges 43 being crimped over a metallic hexport 47 capable of withstanding pressures of at least 3000 to 5000 psi. The hexport 47 includes a central pressure inlet passage 5 for entry into the transducer of the high pressure fluid to be measured. A gasket 9 or O-ring and back-up ring 33 is positioned within the can 41 and spaces the pressure sensing element 7 from the hexport 47, the other surface of the element 7 resting against an interior wall of the can. The electronic circuitry 11 is positioned external of the can 41 on the wall against which the pressure sensing element 7 rests. The plastic electrical connector 13 is disposed over the electronic circuitry 11 with the crimping flange 45 being crimped over the flange 15 of the connector to form the completed pressure transducer. It can be seen that the pressure sensing element as well as all high pressure containing locations have been physically separated from the electronic circuitry as well as the electrical connector by a metal member capable of withstanding the pressures to be encountered.

Figure 4:
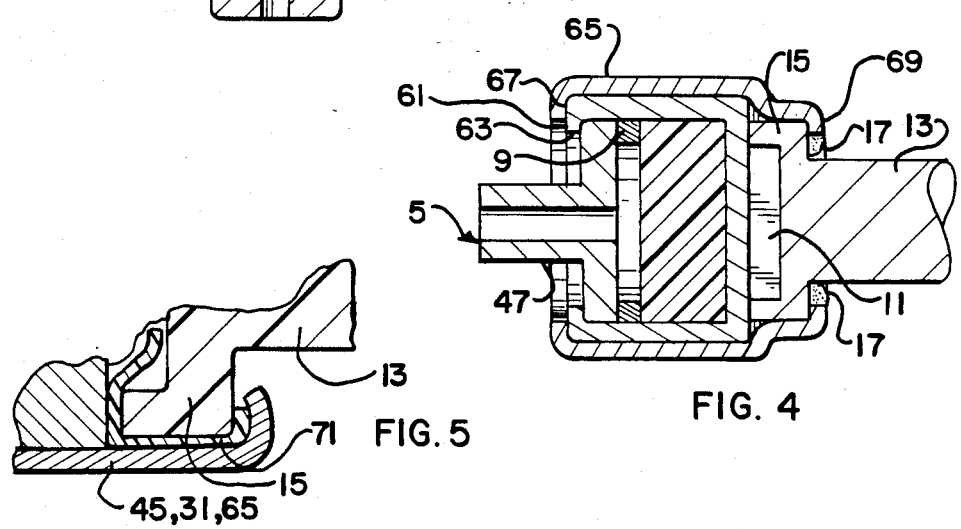
FIG. 4 is a cross sectional view of a pressure transducer in accordance with a third embodiment of the present invention.

Referring now to FIG. 4 wherein all character references corresponding to those previously used represent the same or similar structure, there is shown a third embodiment in accordance with the present invention. This embodiment includes a first interior metal can 61 which includes a flange 63, similar to the flange 43, for crimping over the hexport 47 with pressure inlet 5. Again, the pressure sensing module 7 is spaced from the inlet 5 by means of a gasket 9 with the module 7 resting against the interior wall of the can 61 remote from the pressure inlet. A second metal can 65 is disposed over the can 61 and includes crimping flanges 67 and 69 at opposite edges thereof. The crimping flange 67 is crimped over the can 61 and the crimping flange 63 thereof. The electronic circuitry 11 is positioned against the exterior of the can wall supporting the pressure sensing module 7 and is surrounded by the plastic electrical connector 13. The flange 69 is crimped over the flange 15 of the connector to provide the completed pressure transducer. Again, it can be seen that the electronic circuitry as well as the electrical connector are isolated from regions of high pressure by a metal member capable of withstanding the pressures to be encountered.

Figure 5:
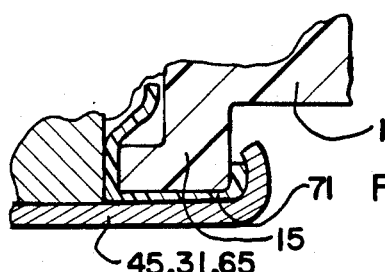
FIG. 5 is a cross sectional view of a pressure transducer in accordance with a fourth embodiment of the present invention.

Referring now to FIG. 5 wherein all character references corresponding to those previously used represent the same or similar structure, there is shown a fourth embodiment in which provision is made to direct connection between the electronic circuitry 11 and the metal can. This is done to provide a direct connection between the circuit module and the can so that the transducer ground pin (circuit ground) can be coupled to the metal can (system ground). This improves the electromagnetic compatibility (EMC) of the transducer. This is accomplished by folding an electrically conductive tail 71 in the form of a flexible conductor and connected to electronic circuit ground over the flange 15 of the connector 13 and then crimping the metal can over the flange and the tail or flexible conductor 71 which is positioned between the flange and the can. As can be seen, this provides a simple interconnection between system ground and circuit ground, as desired.

Though the invention has been described with respect to specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A pressure transducer which comprises, in combination:
   (a) housing means having a high pressure fluid inlet;
   (b) a pressure sensing element communicating with said fluid inlet and disposed within said housing means;
   (c) a rigid support member abutting said pressure sensing element, said support member having a pair of opposed surfaces and secured within said housing and capable of sustaining the pressures to be encountered at the pressure inlet portion thereof, supporting said pressure sensing element on one of said opposed surfaces; and
   (d) an electrical connector secured to at least one of the other opposed surface of said support member and said housing means and isolated from said pressure sensing element by said support member.

2. A pressure transducer as set forth in claim 1 further including an electronic circuit module disposed on the other opposed surface of said support member and remote from said pressure sensing element.

3. A pressure transducer as set forth in claim 2 wherein said electrical connector is formed of a material more readily deformable under high pressure than said housing means and said support means.

4. A pressure transducer as set forth in claim 1 wherein said electrical connector is formed of a material more readily deformable under high pressure than said housing means and said support means.

5. A pressure transducer which comprises, in combination:
   (a) housing means having a high pressure fluid inlet;
   (b) a pressure sensing element communicating with said fluid inlet and disposed within said housing means;
   (c) a support member secured within said housing and capable of sustaining the pressures to be encountered at the pressure inlet portion thereof supporting said pressure sensing element thereagainst; and
   (d) an electrical connector secured to at least one of said support member and said housing means and isolated from said pressure sensing element by said support member;
   (e) wherein said support member includes a hollow central region and an electronic circuit module disposed in said hollow central region.

6. A pressure transducer as set forth in claim 5 wherein said electrical connector is formed of a material more readily deformable under high pressure than said housing means and said support means.

7. A pressure transducer as set forth in claim 5 further including an electrical conductive member secured between the ground of said electrical module and said housing means.

8. A pressure transducer which comprises, in combination:
   (a) a rigid housing having an interior wall and a high pressure fluid inlet and capable of withstanding high pressures applied thereto;
   (b) a pressure sensing element communicating with said fluid inlet and disposed within and abutting said interior wall of said housing;
   (c) first flange means integral with said housing means and extending externally thereof; and
   (d) an electrical connector secured to said first flange externally of and abutting said housing means.

9. A pressure transducer as set forth in claim 8 further including an electronic module disposed externally of said housing and disposed thereon, said electronic module being electrically connected to said pressure sensing element and said electrical connector.

10. A pressure transducer as set forth in claim 9 wherein said electrical connector is formed of a material more readily deformable under high pressure than said housing.

11. A pressure transducer as set forth in claim 8 wherein said electrical connector is formed of a material more readily deformable under high pressure than said housing.

12. A pressure transducer which comprises, in combination:
   (a) housing means having a high pressure fluid inlet;
   (b) a pressure sensing element communicating with said fluid inlet and disposed within and abutting an interior wall of said housing means;
   (c) a first flange member integral with said housing means and extending externally thereof; and
   (d) an electrical connector secured to said first flange member;
   (e) wherein said housing means includes a hexport having a central bore defining said high pressure fluid inlet, said housing means further including a second flange member securing said hexport therein.

13. A pressure transducer as set forth in claim 12 further including an electronic module disposed externally of said housing means and disposed thereon, said electronic module being electrically connected to said pressure sensing element and said electrical connector.

14. A pressure transducer as set forth in claim 13 wherein said electrical connector is formed of a material more readily deformable under high pressure than said housing means and said support means.

15. A pressure transducer as set forth in claim 12 wherein said electrical connector is formed of a material more readily deformable under high pressure than said housing means and said support means.

16. A pressure transducer which comprises, in combination:
   (a) a housing having a high pressure fluid inlet, said housing including a first housing member forming an interior cavity and having an inside wall and an exterior wall and having said fluid inlet remote from said inside wall and a second housing member having first and second flanges at opposing edges thereof, said first flange being secured to said first housing member;

(b) a pressure sensing element communicating with said fluid inlet and disposed within and abutting said inside wall of said first housing member; and (c) an electrical connector disposed external to said first housing member on said exterior wall and secured to said second flange member.

17. A pressure transducer as set forth in claim 16 further including an electronic module disposed externally of said housing and disposed thereon over said exterior wall, said electronic module being electrically connected to said pressure sensing element and said electrical connector.

18. A pressure transducer as set forth in claim 17 wherein said electrical connector is formed of a material more readily deformable under high pressure than said housing.

19. A pressure transducer as set forth in claim 16 wherein said electrical connector is formed of a material more readily deformable under high pressure than said housing.

20. A pressure transducer which comprises, in combination:

(a) housing means having a high pressure fluid inlet, said housing means including a first housing member forming an interior cavity and having an inside wall and having said fluid inlet remote from said wall and a second housing member having first and second flanges at opposing edges thereof, said first flange being secured to said first housing member;

(b) a pressure sensing element communicating with said fluid inlet and disposed within and abutting said wall of said first housing member; and (c) an electrical connector disposed external to said first housing member and secured to said second flange member;

wherein said housing means includes a hexport having a central bore defining said high pressure fluid inlet, said first housing member further including a third flange member securing said hexport therein.

21. A pressure transducer as set forth in claim 20 further including an electronic module disposed externally of said housing means and disposed thereon, said electronic module being electrically connected to said pressure sensing element and said electrical connector.

22. A pressure transducer as set forth in claim 21 wherein said electrical connector is formed of a material more readily deformable under high pressure than said housing means and said support means.

23. A pressure transducer as set forth in claim 20 wherein said electrical connector is formed of a material more readily deformable under high pressure than said housing means and said support means.

24. A pressure transducer which comprises, in combination:

(a) housing means having a high pressure fluid inlet;

(b) a pressure sensing element communicating with said fluid inlet and disposed within and abutting an interior wall of said housing means;

(c) a first flange member integral with said housing means and extending externally thereof; and (d) an electrical connector secured to said first flange member;

(e) further including an electronic module disposed externally of said housing means and disposed thereon, said electronic module being electrically connected to said pressure sensing element and said electrical connector;

(f) further including an electrical conductive member secured between the ground of said electronic module and said housing means.

25. A pressure transducer which comprises, in combination:

(a) housing means having a high pressure fluid inlet, said housing means including a first housing member forming an interior cavity and having an inside wall and having said fluid inlet remote from said wall and a second housing member having first and second flanges at opposing edges thereof, said first flange being secured to said first housing member;

(b) a pressure sensing element communicating with said fluid inlet and disposed within and abutting said wall of said first housing member; and (c) an electrical connector disposed external to said first housing member and secured to said second flange member;

(d) further including an electronic module disposed externally of said housing means and disposed thereon, said electronic module being electrically connected to said pressure sensing element and said electrical connector;

(e) further including an electrical conductive member secured between the ground of said electrical module and said housing means.

* * * * *